(12) United States Patent
Fujiwara et al.

(10) Patent No.: US 7,990,253 B2
(45) Date of Patent: Aug. 2, 2011

(54) VEHICULAR THEFT PREVENTING DEVICE

(75) Inventors: Takao Fujiwara, Wako (JP); Hideteru Umahashi, Wako (JP); Takeshi Konno, Wako (JP); Masayuki Mitsuyoshi, Yokohama (JP); Satoru Futami, Yokohama (JP); Ken Kubota, Yokohama (JP)

(73) Assignees: Honda Motor Co., Ltd., Tokyo (JP); Visteon Japan Ltd., Yokohama-shi, Kanagawa (JP)

( * ) Notice: Subject to any disclaimer, the term of this patent is extended or adjusted under 35 U.S.C. 154(b) by 362 days.

(21) Appl. No.: 12/414,108

(22) Filed: Mar. 30, 2009

(65) Prior Publication Data
US 2009/0243820 A1    Oct. 1, 2009

(30) Foreign Application Priority Data

Mar. 28, 2008 (JP) ................................ P2008-087362

(51) Int. Cl.
*B60R 25/10* (2006.01)

(52) U.S. Cl. ...................................... 340/426.1; 340/430
(58) Field of Classification Search ............... 340/426.1, 340/426, 5.22, 430
See application file for complete search history.

(56) References Cited

U.S. PATENT DOCUMENTS 5,412,370 A * 5/1995 Berman et al. ........... 340/426.36
* cited by examiner

*Primary Examiner* — Shirley Lu
(74) *Attorney, Agent, or Firm* — Birch, Stewart, Kolasch & Birch, LLP

(57) ABSTRACT

Vehicular theft preventing device includes: an operation switch for switching between different displays on a display section, the operation switch being constructed to function also as a setting switch operable to set the preventing device in an alert mode; a main switch for turning on/off a power supply; and a control section for controlling the display section and an alarm unit, the controlling section setting the preventing device in the alert mode upon fulfillment of a condition that the operation switch has been operated while the main switch is in an OFF state.

3 Claims, 8 Drawing Sheets

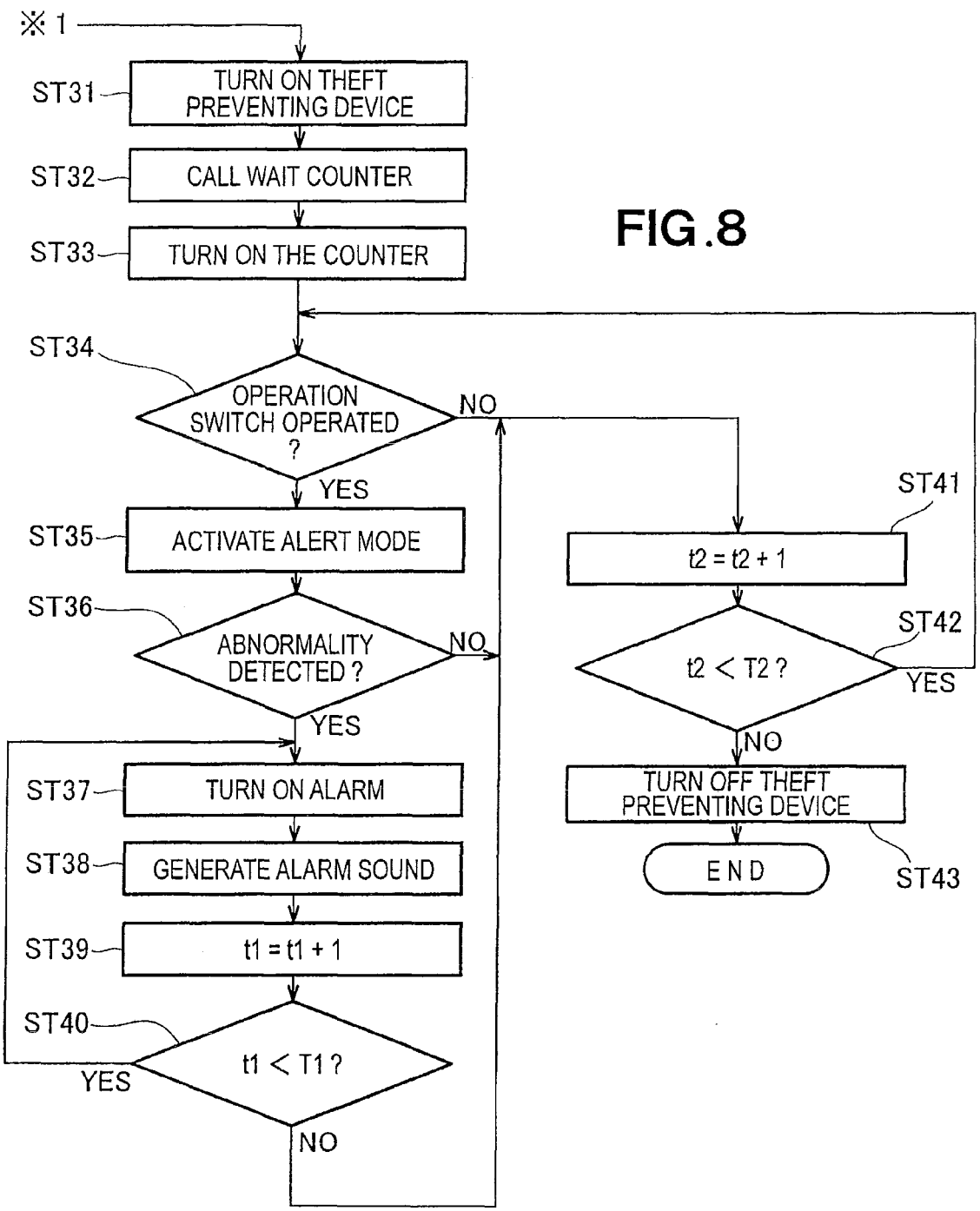

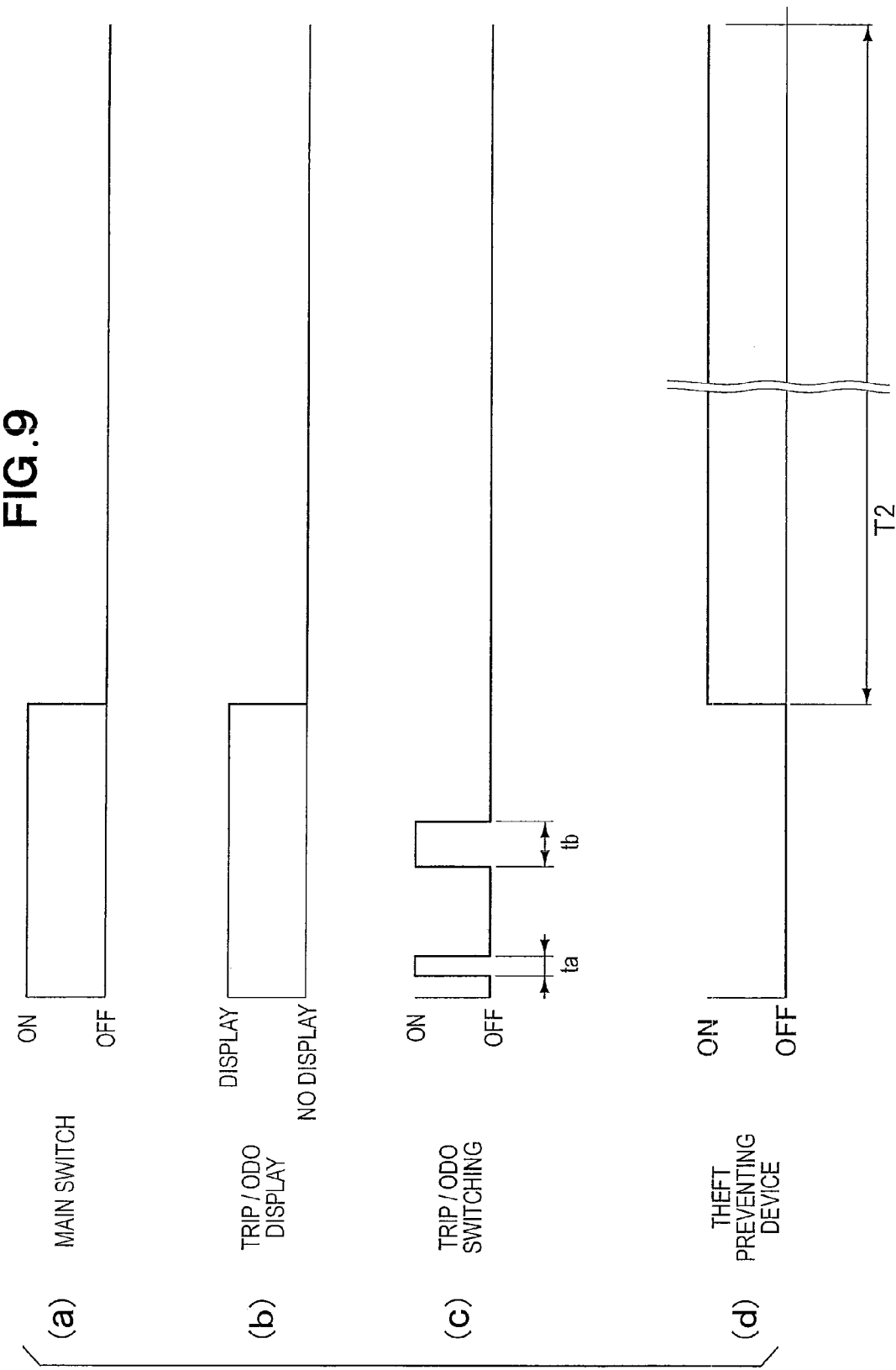

VEHICULAR THEFT PREVENTING DEVICE

CROSS-REFERENCE TO RELATED APPLICATIONS

The present application claims priority under 35 USC 119 to Japanese Patent Application No. 2008-087362 filed on Mar. 28, 2008 the entire contents of which are hereby incorporated by reference.

FIELD OF THE INVENTION

The present invention relates to vehicular theft preventing devices having an alert-mode setting switch for setting the theft preventing device in an alert mode.

BACKGROUND OF THE INVENTION

Vehicular theft preventing device having a setting switch for setting the theft preventing device in an alarm unit is proposed, for example, in Japanese Patent Application Laid-Open Publication No. HEI-10-305789 (JP 10-305789 A). In the vehicular theft preventing device disclosed in JP 10-305789 A, a theft preventing circuit includes an electronic theft preventing key, an inclination angle sensor, a secret setting switch, etc. The theft preventing circuit is activated in response to turning-on of the secret setting switch.

However, with the vehicular theft preventing device disclosed in JP 10-305789 A, where the separate, secret setting switch dedicated to the vehicle is provided, it is necessary to secure a space for installing wiring for connection to the setting switch, and thus, it is considerably difficult to freely position the setting switch and the positioning of the setting switch would entail great limitations. In addition, the setting switch must be provided at such a position of the vehicle body that it can not be readily found by third persons. Positioning the setting switch at a hard-to-find position would influence the overall layout of various components on the vehicle body and thus undesirably lower the design freedom of the vehicle.

SUMMARY OF THE INVENTION

In view of the foregoing prior art problems, it is an object of the present invention to provide an improved vehicular theft preventing device which is of a type having a setting switch operable to the theft preventing device in an alert mode and which can be installed on the vehicle without lowering the design freedom of the vehicle.

In order to accomplish the above-mentioned object, the present invention provides an improved vehicular theft preventing device, which comprises: a display section provided in front of a seated vehicle driver; an alarm unit; a detection sensor for detecting abnormality of the vehicle; an operation switch provided on the display section for switching between different kinds of displays on the display section, the operation switch being constructed to function also as a setting switch operable, in response to detection of abnormality the detection sensor, to set the theft preventing device in an alert mode where the alarm unit is caused to generate an alarm sound in response to abnormality detected by the detection sensor; a main switch for turning on/off a power supply of the vehicle; and a control section for controlling the display section and the alarm unit, the controlling section setting the theft preventing device in the alert mode upon fulfillment of a condition that the operation switch has been operated while the main switch is in an OFF state.

Because the operation switch is constructed to function also as the setting switch, there is no need to provide a separate, dedicated setting switch, and thus, it is possible to reduce the number of necessary component parts and hence an installing space therefor. Thus, there is no need to consider relationship between the setting switch and the other component parts, so that it is possible to enhance the design freedom of the vehicle. Further, because the operation switch is constructed to function also as the setting switch, it is possible to make it difficult for any third person to identify the position of the setting switch as compared to the case where a separate, dedicated setting switch is provided, which can thereby prevent any third person from impairing or vandalizing the setting switch.

Further, because the control section has the function of setting the theft preventing device in the alert mode upon fulfillment of the condition that the operation switch has been operated while the main switch is in an OFF state, namely, because the operation switch and the main switch are operatively interconnected so that the theft preventing device is set in the alert mode in response to operation of the operation switch while the main switch is in the OFF state, the present invention can simplify and facilitate a series of operation, from turning-off of the power supply up to alert-mode setting operation of the setting switch, which are to be performed by the driver. For example, the driver does not have to perform a cumbersome move, such as largely moving his or her body, when operating the setting switch.

Preferably, the control section includes a first control unit for controlling the display section, and a second control unit for controlling the theft preventing device. Thus, even when any problem has occurred to one of the first and second control units, the other control unit can still operate with no problem. As a consequence, it is possible to significantly reduce a possibility that the display section and the theft preventing device simultaneously become malfunctioning, with the result that each of the display section and the theft preventing device can operate with an increased reliability.

Preferably, in a non-alert mode with the main switch in an ON state, the first control unit is held in an activated state while the second control unit is held in a deactivated state, and, in the alert mode the main switch in the OFF state, the second control unit is held in an activated state while the first control unit is held in a deactivated state. Namely, the control unit to be used is switched between the first and second control units, depending on whether the main switch is currently in the ON state or in the OFF state. More specifically, only the second control unit having the necessary theft preventing device control function is used in the alert mode, so that power consumption in the alert mode can be effectively reduced.

Preferably, when the OFF state of the main switch having been turned off has continued for a predetermined time, the second control unit is switched to the deactivated state. In this way, power consumption by a standby current of the second control unit can be avoided, so that rundown of a power supplying battery of the vehicle can be avoided.

Preferably, when the main switch has been turned on from the OFF state while theft preventing device is in the alert mode, the alert mode is automatically canceled. Thus, there is no need to provide a dedicated switch for deactivating or canceling the alert mode, with the result that usability of the vehicular theft preventing device can be enhanced.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 8 is a control flow chart explanatory of behavior of the vehicular theft preventing device; and FIG. 9 is a time chart explanatory of behavior of the vehicular theft preventing device.

DETAILED DESCRIPTION OF THE PREFERRED EMBODIMENTS

Figure 1:
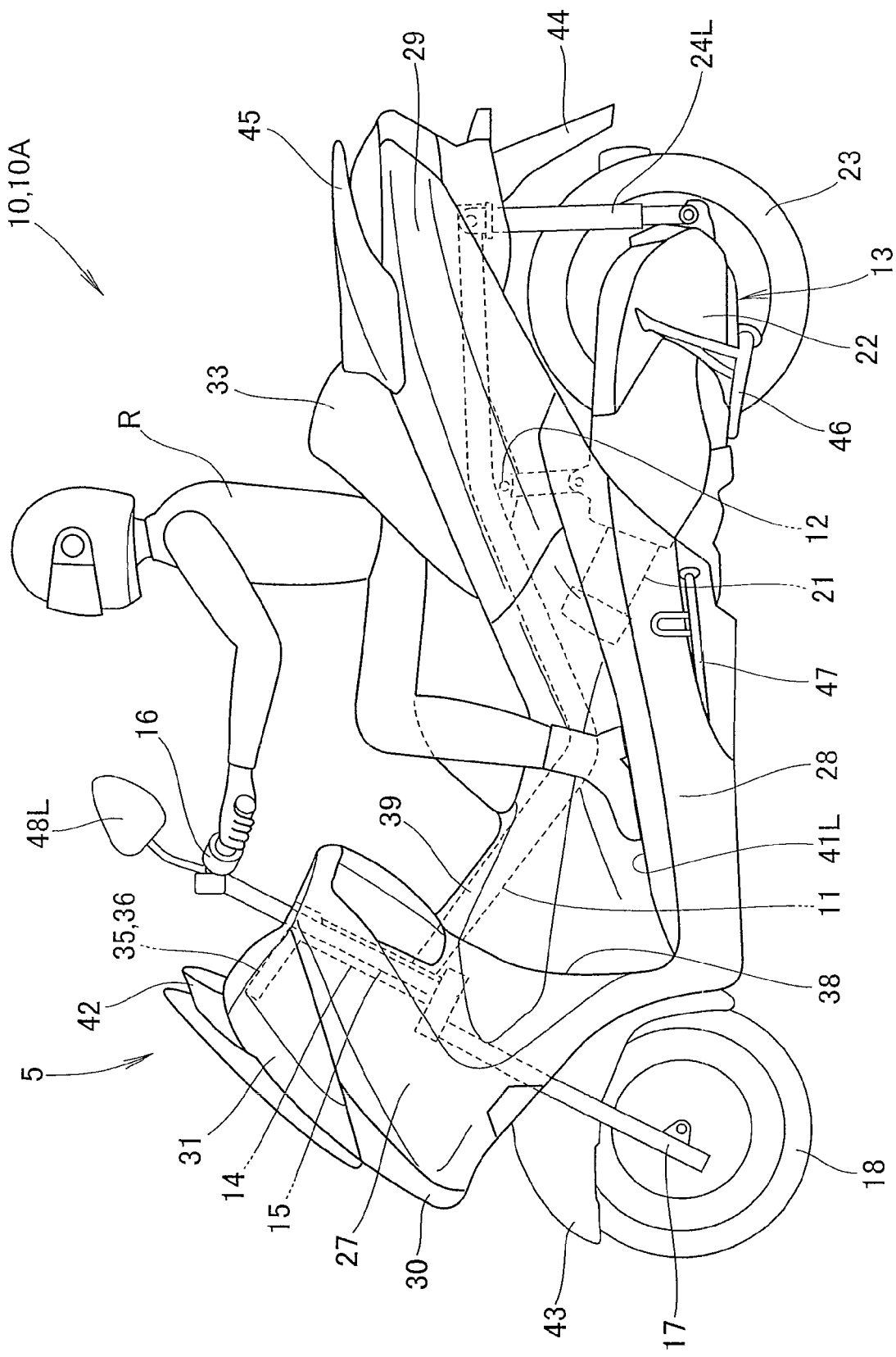
FIG. 1 is a left side view of a vehicle provided with a theft preventing device according to an embodiment of the present invention.

Reference is now made to FIG. 1 showing in left side elevation a vehicle provided with a theft preventing device according to an embodiment of the present invention. The vehicle 10 is, for example, a two-wheeled motor vehicle 10A of the so-called "unit swing" type, which includes a vehicle body frame 11 and a power unit 13 vertically pivotably mounted to the vehicle body frame 11 via a pivot point 12.

The vehicle body frame 11 has a head pipe 14 constituting a front end portion of the vehicle body frame 11, and a steering shaft 15 is steerably mounted to the head pipe 14. Steering wheel 16 and a front fork 17 are connected to upper end lower ends, respectively, of the steering shaft 15, and a front wheel 18 is rotatably connected to a lower end portion of the front fork 17.

The power unit 13 includes a water-cooled engine 21 extending substantially horizontally forward, and a transmission unit 22. Rear wheel 23, which is a driving wheel, is connected to a rear end portion of the transmission unit 22.

Left and right rear cushion units (only the left rear cushion unit 24L is shown) are provided between the rear end of the transmission unit 22 and an intermediate portion of the vehicle body frame 11.

The vehicle body frame 11 is covered with a vehicle body covering 5 that includes, in a front-to-rear direction, a front vehicle body cover 27, an intermediate vehicle body cover 28 and a rear vehicle body cover 29. Reference numeral 30 indicates headlights as accessories to be later described.

The front vehicle body cover 27 includes a front cover 31 constituting a front surface of the vehicle, a front meter panel 36 having a display section 35 provided thereon in front of a vehicle driver R seated in a seat 33, a leg shield 38 provided below the front meter panel 36 to cover driver's legs, a tunnel member 39 provided rearwardly to be located between driver's thighs, and step floors 41L and 41R (only the left step floor 41L is shown in FIG. 1) as driver's footrests located to the left and right of the tunnel member 39.

Further, in FIG. 1, reference 42 indicates a front shield, 43 a front fender, 44 a rear fender, 45 a grab rail, 46 a main stand, 48L and 48R left and right mirrors (only the left mirror 48L is shown in FIG. 1).

Figure 2:
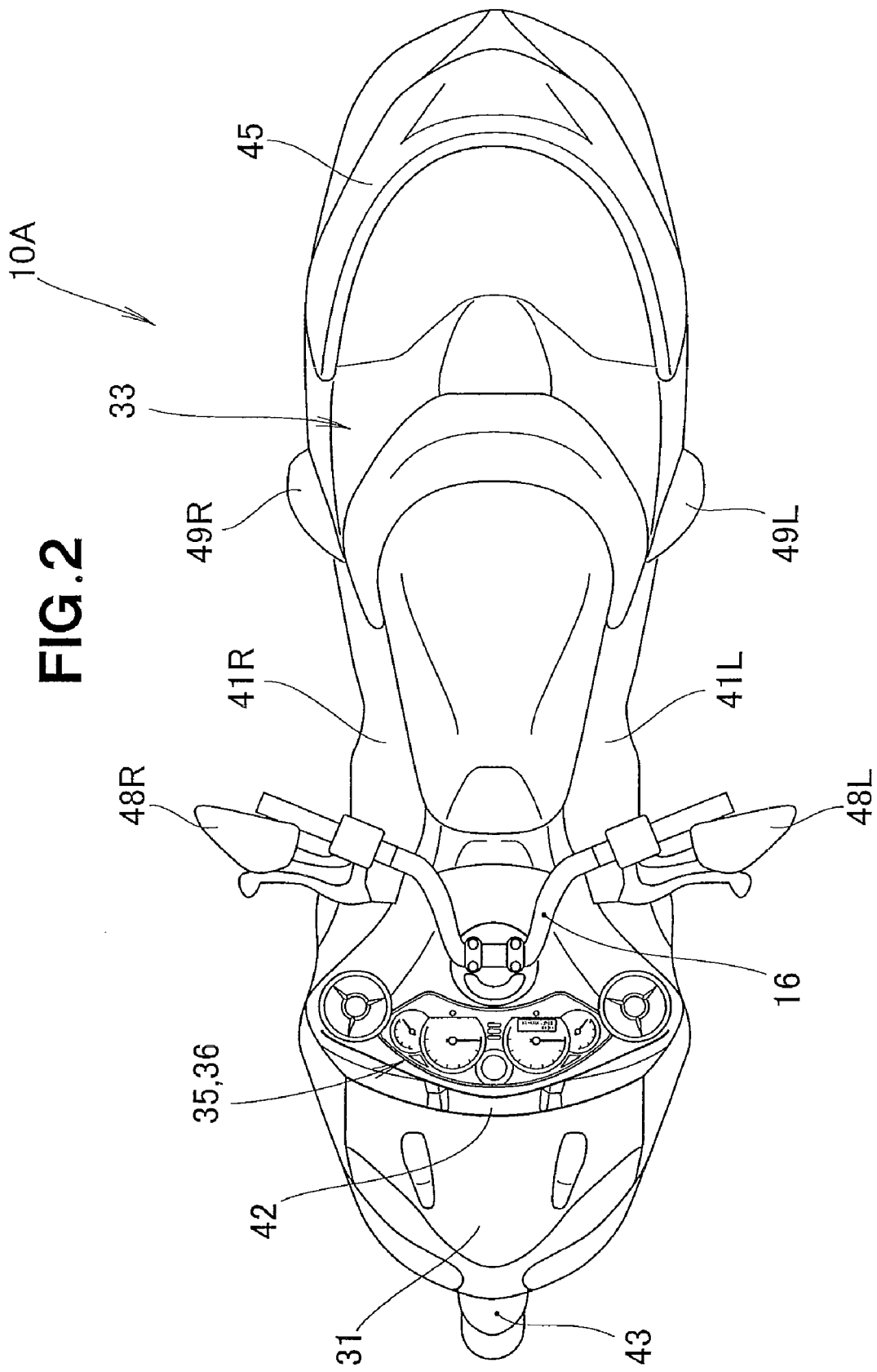
FIG. 2 is a top plan view of the vehicle provided with the theft preventing device of the present invention.

FIG. 2 is a plan view showing the vehicle 10 provided with the theft preventing device of the present invention. The seat 33 is formed substantially centrally of the two-wheeled motor vehicle 10A for seating the vehicle driver and pillion passenger in tandem. 40L and 49R indicate pillion steps as footrests for the pillion passenger.

Figure 3:
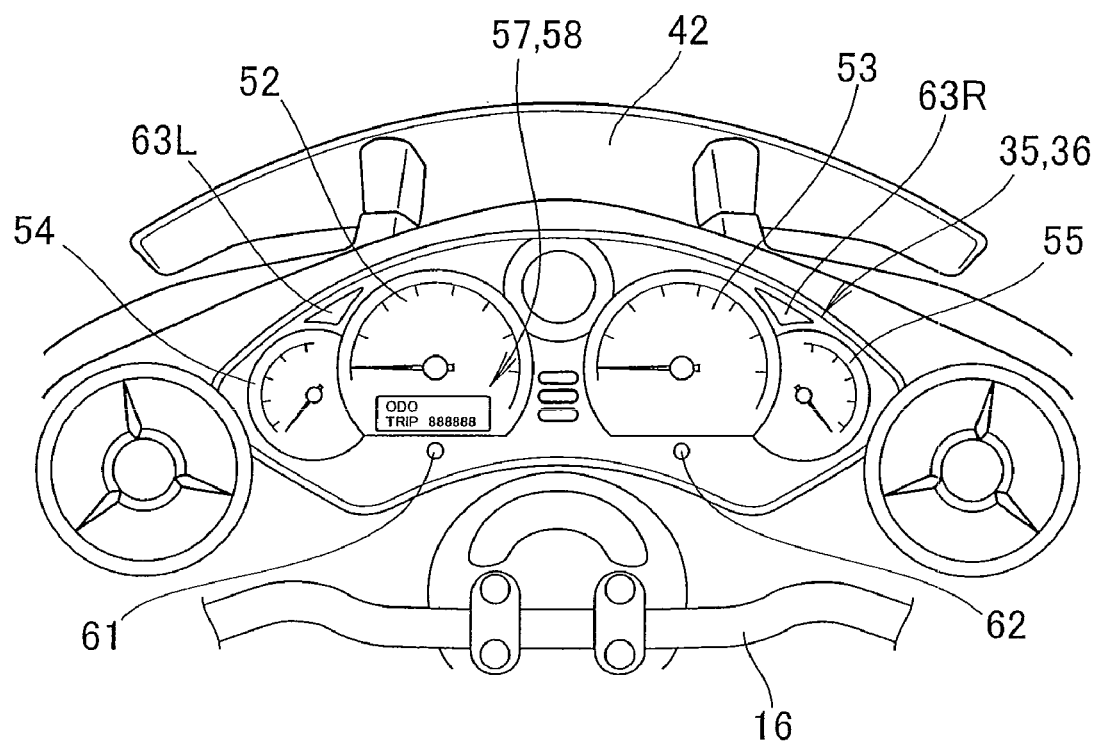
FIG. 3 is a view showing a display section of the vehicular theft preventing device.

FIG. 3 is a view showing the display section 35 provided on the front meter panel 36. The display section 35 includes a speed meter 52, an engine rotation meter 53, a fuel meter 54 provided to the left of the speed meter 52, and a water temperature meter 55 provided to the right of the engine rotation meter 53 for indicating a temperature of an engine cooling water.

The speed meter 52 includes an odometer 57 for displaying total mileage and a trip distance meter 58 for displaying trip mileage, and an operation switch 61 for switching between the mileage displays of the odometer 57 and the trip distance meter 58.

Further, in FIG. 2, reference numeral 62 indicates an indicator that is blinked or illuminated while the theft preventing device 75 is in operation, and 63L and 63R indicate left and right direction indicators.

Figure 4:
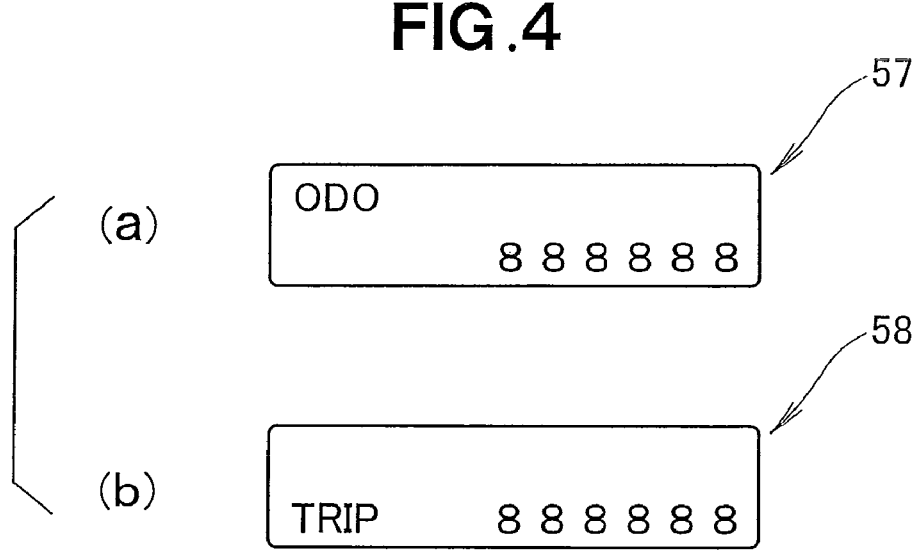
FIG. 4 is a view explanatory of mileage displays of an odometer and a trip distance meter.

FIG. 4 is a view explanatory of operation of the odometer 57 and the trip distance meter 58. (a) of FIG. 4 shows an example of the total mileage display of the odometer 57 when a later-described main switch is ON. (b) of FIG. 4 shows an example of the trip mileage display of the trip distance meter 58 when the main switch is ON. Switching between the total mileage display of the odometer 57 and the trip mileage display of the trip distance meter 58 can be effected in response to operation of the operation switch 61 provided below the speed meter 52 shown in FIG. 3.

Figure 5:
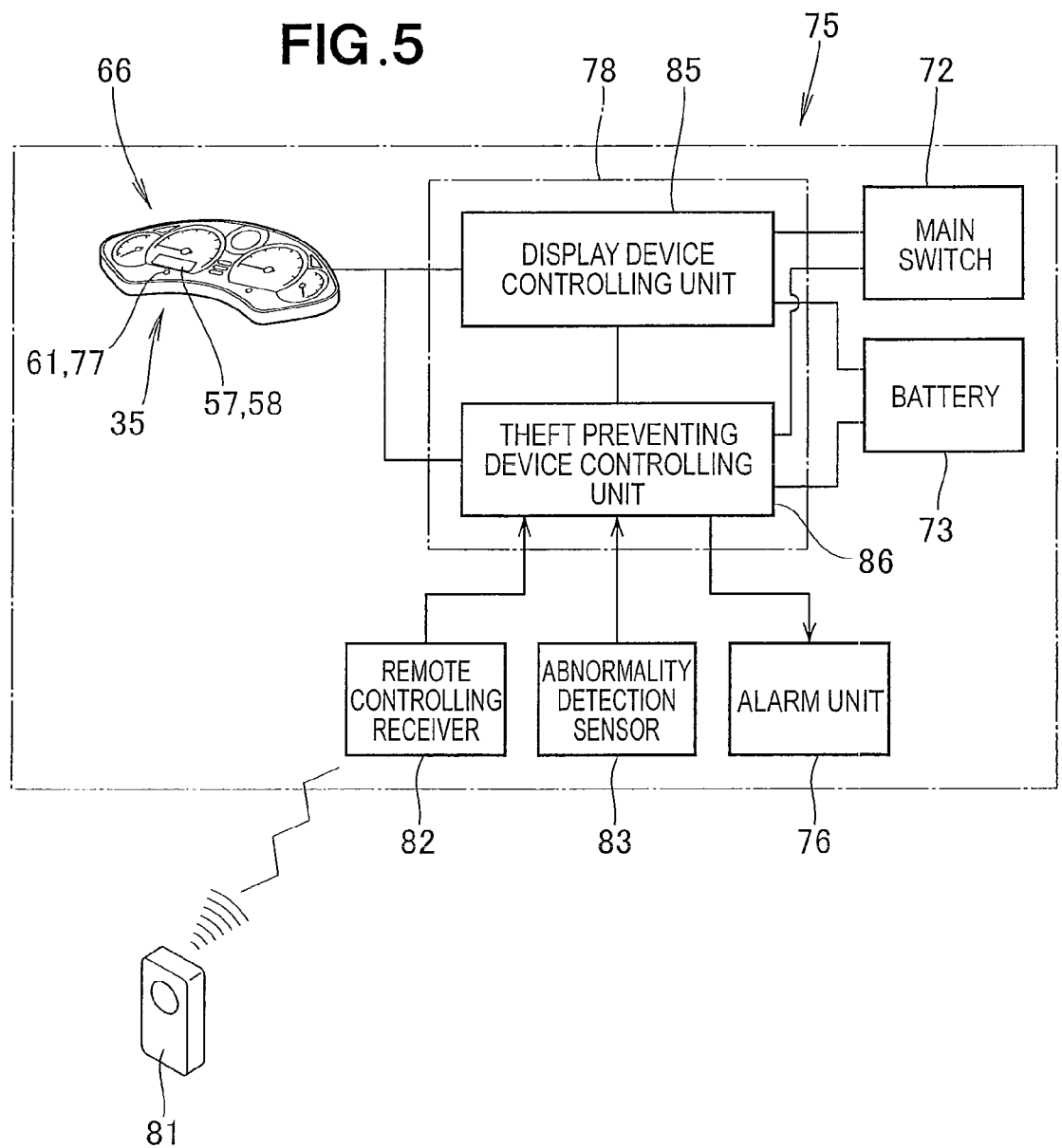
FIG. 5 is a block diagram of the display section that includes the vehicular theft preventing device.

FIG. 5 is a block diagram of the display section 35 that includes the theft preventing device 75. Namely, a display apparatus 66 of the two-wheeled motor vehicle 10A includes the display section 35, a display section controlling unit (i.e., first control unit to be later described) 85 for controlling the display section 35, and the main switch 72 connected to an electric circuit, including the display control unit 71, for turning on/off a power supply (i.e., battery) 73 of the vehicle.

The vehicular theft preventing device 75 comprises: the operation switch 61 provided on the display section 35 switching between the mileage displays of the odometer 57 and trip distance meter 58 provided on the display section 35; a setting switch 77 responsive to occurrence of an abnormal state for activating an alert mode to cause an alarm unit 76 to generate an alarm sound; the main switch 72 for turning on/off the power supply of the vehicle; and a control section 78 for controlling the display section 35 and the alarm unit 76. The operation switch 61 is constructed to function also as the setting switch 77.

The vehicular theft preventing device 75 also includes remote controlling transmitter and receivers 81 and 82, so that the theft preventing device 75 can be turned on/off through operation of the remote-controlling transmitter 81. Reference numeral 83 indicates an abnormality detection sensor.

Because the operation switch 61 is constructed to function also as the setting switch 77 as noted above, there is no need to provide a separate, dedicated setting switch, and thus, it is possible to reduce the number of necessary component parts and hence an installing space therefor. Thus, because there is no need to consider relationship between the setting switch and the other component parts, it is possible to enhance the design freedom of the vehicle.

Further, because the operation switch 61 is constructed to function also as the setting switch 77 as noted above, it is possible to make it difficult for any third person to identify the position of the setting switch 77 as compared to the case where a separate, dedicated setting switch is provided, which can thereby prevent any third person from impairing or vandalizing the setting switch. Details of the operation switch 61 will be discussed later.

In the instant embodiment, the control section 78 includes the first control unit (or display section controlling unit) 85 for controlling the display section 35, and a second control unit (or theft preventing device controlling unit) 86 for controlling the vehicular theft preventing device 75.

Switching can be made as desired between the first and second control units 85 and 86 that are dedicated for control of the display section 35 and theft preventing device 75, respectively, and thus, there can be achieved the advantage that, even when any problem has occurred to one of the control units 85 or 86, the other control unit 86 or 85 can operate with no problem, so that each of the display section 35 and theft preventing device 75 can operate with an increased reliability.

More specifically, only one of the control units 85 or 86 is selectively activated and used in response to turning-on or turning-off of the main switch 72, and the other control unit 86 or 85 not used can be held in a deactivated (or OFF) state. Thus, in the alert mode, only one of the control units 86, which has the necessary function, can be used, so that power consumption can be effectively reduced.

In an alternative, the display section controlling unit 85 and theft preventing device controlling unit 86 may be integrated with each other as necessary.

Figure 6:
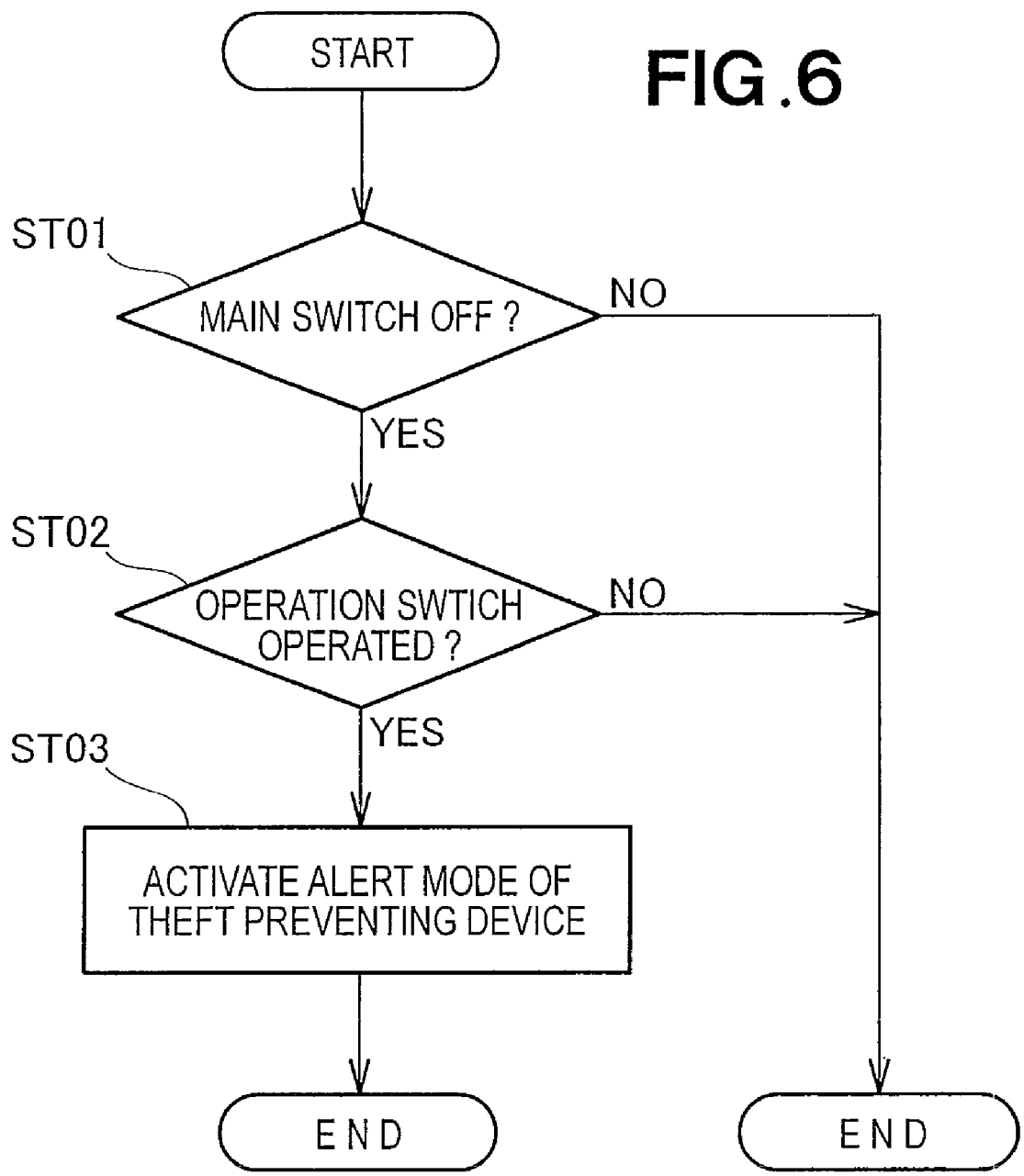
FIG. 6 is a control flow chart explanatory of behavior of the vehicular theft preventing device.

Next, with combined reference to FIGS. 1-5 and 6-9, a description will be given about behavior of the theft preventing device 75. FIG. 6 is a control flow chart explanatory of behavior of the vehicular theft preventing device 75.

At step ST01, a determination is made as to whether the main switch 72 is currently in the OFF position (state). If the main switch 72 is currently in the OFF position as determined at step ST01, control proceeds to step ST03, while, if the main switch 72 is currently in the ON position (state) as determined at step ST01, control is brought to an end. Then, at step ST02, a further determination is made as to whether the operation switch 61 has been operated. If the operation switch 61 has been operated as determined at step ST02, control moves on to step ST03, while, if the operation switch 61 has not been operated as determined at step ST02, control is brought to an end. At step ST03, the theft preventing device 75 is set in the alert mode, so that the vehicular theft preventing device 75 starts monitoring the vehicle by means of the abnormality detection sensor 83.

Namely, the control section 78 has a function of setting the theft preventing device 75 in the alert mode, upon fulfillment of the condition that the operation switch 61 has been operated while the main switch is currently in an OFF state.

Namely, the operation switch 61 and the main switch 72 are operatively interconnected so that the theft preventing device 75 is set in the alert mode in response to operation of the operation switch 61 while the main switch 72 is OFF, and thus, the instant embodiment can simplify and facilitate a series of operation, from turning-off of the power supply of the vehicle to operation of the operation switch 61 capable of functioning also as the setting switch, which are to be performed by the vehicle driver.

Heretofore, in the case where the secret setting switch is provided at a hard-to-find position of the vehicle, the driver had to perform some cumbersome move, such as inserting his or her hand into a narrow space where the setting switch is located or bowing (or moving his or her body relatively largely).

Importantly, in the instant embodiment of the present invention, the operation switch 61 is constructed to function also as the setting switch, as noted above. Thus, as long as the operation switch 61 is provided on the front meter panel 36, the driver does not have to perform a cumbersome move, such as largely moving his or her body, so that operability when turning on or off the theft preventing device 75 can be significantly enhanced.

Figure 7:
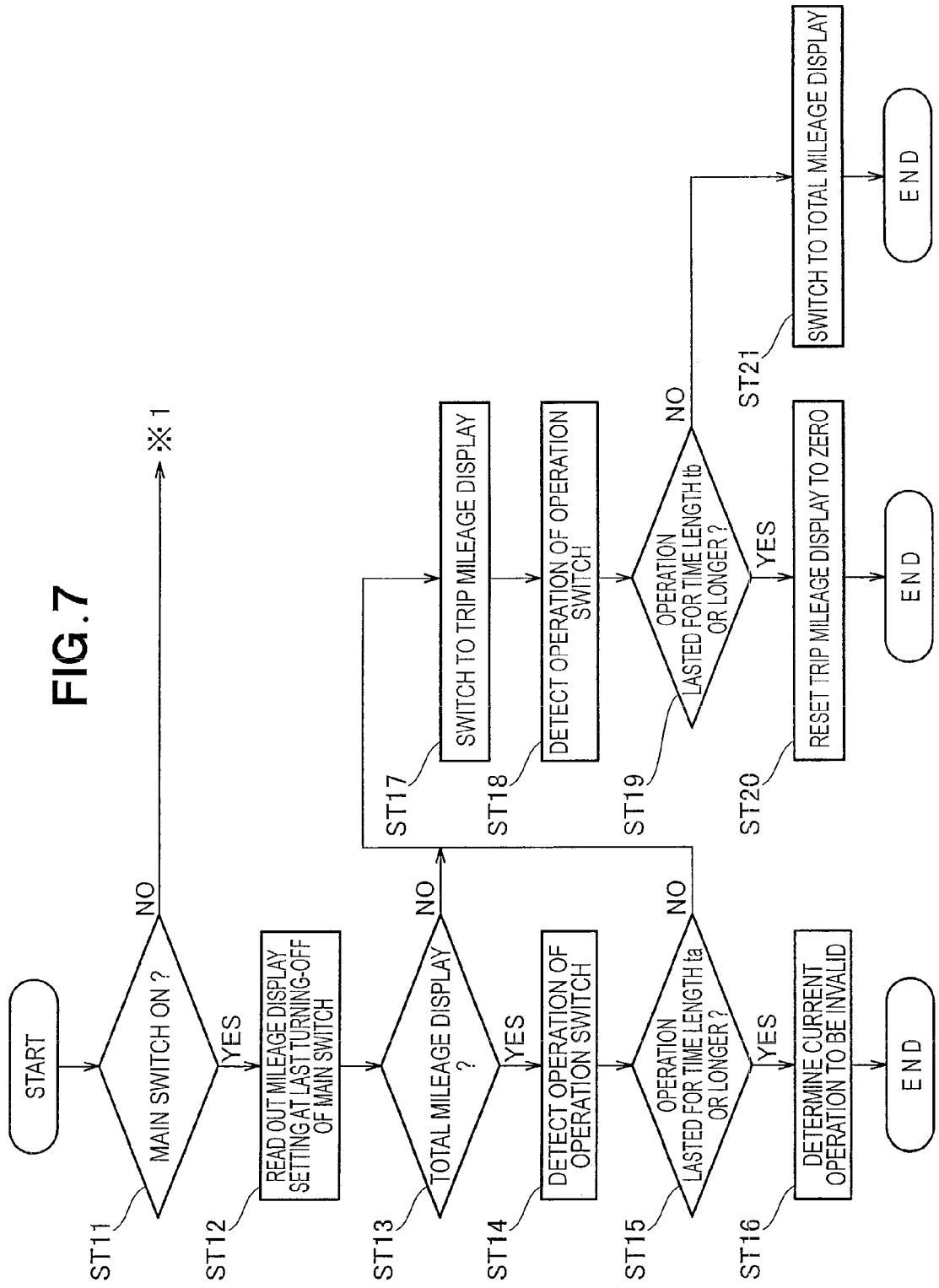
FIG. 7 is a control flow chart explanatory of behavior of the display section.

FIG. 7 is a control flow chart explanatory of behavior of the display section 35, which shows in more detail the flow chart of FIG. 6. At step ST11, a determination is made as to whether the main switch 72 is currently in the ON position. If the main switch 72 is currently in the ON position as determined at step ST11, control proceeds to step ST12, while, if the main switch 72 is not currently in the ON position as determined at step ST11, control branches to step ST31 of FIG. 8 by way of a connection point*1.

At step S12, data indicative of a distance displayed when the main switch 72 was last turned off (i.e., mileage display setting at the time of last turning-off of the main switch 72) is read out, and then control proceeds to step ST13. At step ST13, a further determination is made as to whether the read-out data is of a total mileage display of the odometer (ODO) 57. With a YES determination at step ST13, control moves on to step ST14, while, with a NO determination at step ST13, control jumps to step ST15.

At step ST14, a detection is made of operation of the operation switch 61. At next step ST15, a determination is made as to whether the current operation of the operation switch 61 has continued for a predetermined time length "ta" or longer; the time length ta is, for example, one second. If the current operation of the operation switch 61 has continued for the predetermined time length ta or longer as determined at step ST15, the current operation is determined to be invalid at step ST16, but, if the current operation of the operation switch 61 has continued for less than the predetermined time length ta, then the distance (mileage) display is switched to the trip mileage display of the trip distance meter (TRIP) 58 at step S17.

At following step ST18, a detection is made of operation of the operation switch 61. At next step ST19, a determination is made as to whether the current operation of the operation switch 61 has continued for a predetermined time length tb or longer; the time length tb is, for example, two seconds. If the current operation of the operation switch 61 has continued for the predetermined time length tb or longer as determined at step ST19, the distance (mileage) display of the trip distance meter (TRIP) 58 is reset to zero at step ST20. If the current operation of the operation switch 61 has continued for less than the predetermined time length tb, the distance (mileage) display is switched to the mileage display of the odometer (ODO) 57 at step ST21.

FIG. 8 is a control flow chart explanatory of behavior of the vehicular theft preventing device 75. The second control unit 86 as the theft preventing device controlling unit is turned on at step ST31, and a wait timer counter provided in the control unit 86 is called at step T32 and turned on at step ST33.

Then, a determination is made, at step ST34, as to whether the operation switch 61 has been operated. With a YES determination at step S34, the alert mode of the vehicular theft preventing device 75 is activated at step ST35, but, with a NO determination at step ST34, control branches to step ST41.

When the abnormality detection sensor 83 has detected abnormality as determined at step ST36, the alarm unit 76 is turned on at step ST37 and generates an alarm sound at step ST38. When the abnormality detection sensor 83 has not detected abnormality as determined at step ST36, control braches to step ST41.

Value "1" is added to a current operating time length t1 of the alarm unit 76 at step ST39. Then, a determination is made, at step ST40, as to whether the operating time length t1 of the alarm unit 76 is below a predetermined value T1. With a YES determination at step ST40, control reverts to step ST37, while, with a NO determination at step ST40, control braches to step ST41.

At step ST41, a value "1" is added to an elapsed time t2 after the turning-on of the wait timer counter. Then, a determination is made, at step ST42, as to whether the elapsed time t2 is below a predetermined value T2 that is indicative of, for example, eight days. With a YES determination, t2 being below the predetermined value T2, the wait timer counter is caused to continue counting, but, if the elapsed time t2 is not below the predetermined value T2, the vehicular theft preventing device 75 is turned off at step ST43.

Namely, when the OFF state of the main switch 72 having been turned off has lasted for the predetermined time (e.g., eight days) T2, the second control unit 86 as the theft preventing device controlling unit is turned off or deactivated. In this way, power consumption by a standby current of the second control unit 86 can be avoided, so that rundown of the power supplying battery 73 can be avoided.

FIG. 9 is a time chart explanatory of behavior of the vehicular theft preventing device 75. The vertical axis in (a) of FIG. 9 indicates the ON/OFF state of the main switch 72, the vertical axis in (b) indicates presence/absence of the distance (mileage) display (TRIP/ODO), the vertical axis in (c) indicates ON/OFF of the trip mileage display and total mileage display when the distance (mileage) display is to be presented, the vertical axis in (d) indicates the ON/OFF state of the theft preventing device 75. Further, in each of (a) to (d) of FIG. 9, the horizontal axis is a time axis.

Once the main switch 72 is turned on in (a) of FIG. 9, either the trip mileage display or the total mileage display is presented on the display section 35. The thus-displayed trip mileage or total mileage can be switched to the other type of mileage display, i.e. total mileage display or trip mileage display, in response to operation of the operation switch 61.

Once the main switch 72 is turned off in (a) of FIG. 9, the mileage display is turned off as indicated in (b), and the vehicular theft preventing device 75 is turned on as indicated in (d). Then, once the predetermined time (e.g., eight days) T2 elapses after the turning-on of the theft preventing device 75, the theft preventing device 75 is turned off automatically. Also, once the main switch 72 is turned on from its OFF state while the theft preventing device is in the alert mode, the alert mode is automatically deactivated or canceled.

Because the alert mode is automatically canceled in response to turning-on operation of the main switch 72 in the alert mode, there is no need to provide a dedicated switch for deactivating or canceling the alert mode, and usability of the vehicular theft preventing device 75 can be enhanced.

The following table is a list of conditions with which the vehicular theft preventing device 75 is turned on (for activation of the alert mode or generation of an alarm sound) is turned off in response to operating states of the main switch 72 and operation switch 61.

| | Main Switch | Operation Switch | Display on Display Section | Theft Preventing Device |
|---|---|---|---|---|
| 1 | ON | Operated | ODO → TRIP | OFF |
| 2 | ON | Operated | TRIP → ODO | OFF |
| 3 | OFF | Operated | NO Display | ON |

Because the operation switch 61 and the main switch 72 are operatively interconnected so that the theft preventing device 75 is set in the alert mode in response to operation of the operation switch (setting switch) 61 while the main switch 72 is OFF, the instant embodiment can greatly simplify and facilitate a series of operation, from turning-off of the power supply to operation of the operation switch 61 (functioning also as the setting switch), which are to be performed by the driver.

Whereas the preferred embodiment of the present invention has been described as applied to a two-wheeled motor vehicle, the present invention is also applicable to three-wheeled motor vehicles and other types of vehicles.

The basic principles of the present invention are well suited for application as a theft preventing device for two-wheeled motor vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicular theft preventing device comprising:
   a display section provided in front of a seated vehicle driver;
   an alarm unit;
   a detection sensor for detecting abnormality of the vehicle;
   an operation switch provided on the display section for switching between displays on the display section, the operation switch being constructed to function also as a setting switch operable, in response to detection of abnormality by the detection sensor, to set the theft preventing device in an alert mode where the alarm unit is caused to generate an alarm sound;
   a main switch for turning on/off a power supply of the vehicle; and
   a control section for controlling the display section and the alarm unit, the controlling section setting the theft preventing device in the alert mode upon fulfillment of a condition that the operation switch has been operated while the main switch is in an OFF state;
   wherein the control section includes a first control unit for controlling the display section, and a second control unit for controlling the theft preventing device;
   wherein, in a non-alert mode with the main switch in an ON state, the first control unit is held in an activated state while the second control unit is held in a deactivated state, and in the alert mode the main switch in the OFF state, the second control unit is held in an activated state while the first control unit is held in a deactivated state.

2. The vehicular theft preventing device according to claim 1, wherein the OFF state of the main switch having been turned off has continued for a predetermined time, the second control unit is switched to the deactivated state.

3. The vehicular theft preventing device according to claim 1, wherein, when the main switch has been turned on from an OFF state while the theft preventing device is in the alert mode, the alert mode is automatically canceled.

* * * * *